United States Patent [19]

Skaiaa

[11] 4,455,712
[45] Jun. 26, 1984

[54] MEANS FOR SPLITTING CARCASSES

[75] Inventor: Leif Skaiaa, Drobak, Norway

[73] Assignee: Elkem a/s, Oslo, Norway

[21] Appl. No.: 486,158

[22] Filed: Apr. 25, 1983

Related U.S. Application Data

[63] Continuation of Ser. No. 272,994, Jun. 12, 1981, abandoned, which is a continuation-in-part of Ser. No. 181,470, Aug. 26, 1980, abandoned.

[51] Int. Cl.³ .............................................. A22B 5/20
[52] U.S. Cl. .......................................... 17/23; 30/308; 83/601
[58] Field of Search ....................... 17/23, 52; 30/308; 83/597, 601

[56] References Cited

U.S. PATENT DOCUMENTS

| | | |
|---|---|---|
| 1,060,169 | 4/1913 | de Moulin . |
| 1,271,909 | 7/1918 | Karhan et al. . |
| 2,775,786 | 1/1957 | Zeitler . |
| 3,829,932 | 8/1974 | Griss ........................................ 17/23 |
| 3,916,482 | 11/1975 | Kvilhaug ................................. 17/23 |
| 4,131,972 | 1/1979 | Yamashita ............................... 17/23 |
| 4,262,388 | 4/1981 | Durand et al. ...................... 17/23 X |

FOREIGN PATENT DOCUMENTS

| | | |
|---|---|---|
| 2050229 | 10/1970 | Fed. Rep. of Germany . |
| 2600766 | 1/1976 | Fed. Rep. of Germany . |
| 2658795 | 12/1976 | Fed. Rep. of Germany . |
| 2807766 | 8/1979 | Fed. Rep. of Germany .......... 17/23 |
| 1566768 | 5/1969 | France . |
| 2309151 | 11/1976 | France . |
| 2307471 | 11/1976 | France . |
| 2362590 | 4/1978 | France ................................... 17/23 |
| 2373969 | 7/1978 | France . |
| 21330 | 7/1957 | German Democratic Rep. . |
| 1131909 | 5/1967 | United Kingdom . |
| 1267872 | 3/1970 | United Kingdom . |
| 1536711 | 1/1976 | United Kingdom . |

Primary Examiner—Willie G. Abercrombie
Attorney, Agent, or Firm—Eyre, Mann, Lucas & Just

[57] ABSTRACT

The present invention relates to apparatus for cutting carcasses, especially hogs. The apparatus comprises a knife to which is imparted an oscillating motion in the vertical direction. This is suitably accomplished by a ramming device arranged at one end of the knife with the knife being pivotably supported by a frame on its opposite end.

4 Claims, 5 Drawing Figures

MEANS FOR SPLITTING CARCASSES

This is a continuation of application Ser. No. 272,994 filed June 12, 1981, which in turn is a continuation-in-part of application Ser. No. 181,470 filed Aug. 26, 1980, both now abandoned.

The present invention relates to an apparatus for longitudinally cutting carcasses of animals. The invention is particularly applicable to the splitting of hogs.

When commercially splitting carcasses, the carcasses are vertically suspended, commonly hooked by their hind feet. The carcasses are split along their entire length. The splitting is started in the pelvic region and continues downwardly to and through the skull. Usually the carcasses are split immediately after slaughter to permit inspection of the vertebral column, the spinal marrow and the brain in order to observe any presence of abscesses or other defects. In order to facilitate a proper and thorough inspection, the cut must be as clean and even as possible. It is essential to have as accurate a cut as possible while avoiding fouling of the adjoining parts by bone splinters, spinal marrow, etc.

A cutting axe or a saw is typically used for this splitting operation. However, each has its disadvantages. Manual splitting using an axe is both time consuming and laborious. Use of a saw such as a circular saw or a band saw overcomes this problem. However, use of a saw produces splinters which are dispersed into the meat thereby contaminating it. Splinters can also result from manual axing.

There have been attempts to use a hammer actuated knife or axe. However, this type of apparatus does not produce a clean cut and is not suitable for splitting the skull or pelvis. Each of these must still be split by other means.

There has now been discovered an apparatus which will quickly and easily split the entire carcass including the pelvis, the middle of the vertebral column, and the skull with an even, clean cut which is free of splinters and other types of contamination.

The present invention is accomplished with an apparatus comprising a knife which is vertically supported by a frame, pivotably mounted at one end and with oscillating means at its opposite end. The changing angle of the knife during its oscillation provides a small, clean chiselling or cutting stroke rather than the splinter-producing chop or sawing action of conventional means. The apparatus preferably includes guide means to ensure accurate cutting throughout the length of the carcass.

These and other features of the present invention may be more fully understood with reference to the preferred embodiments shown in the drawing wherein.

Figure 1:
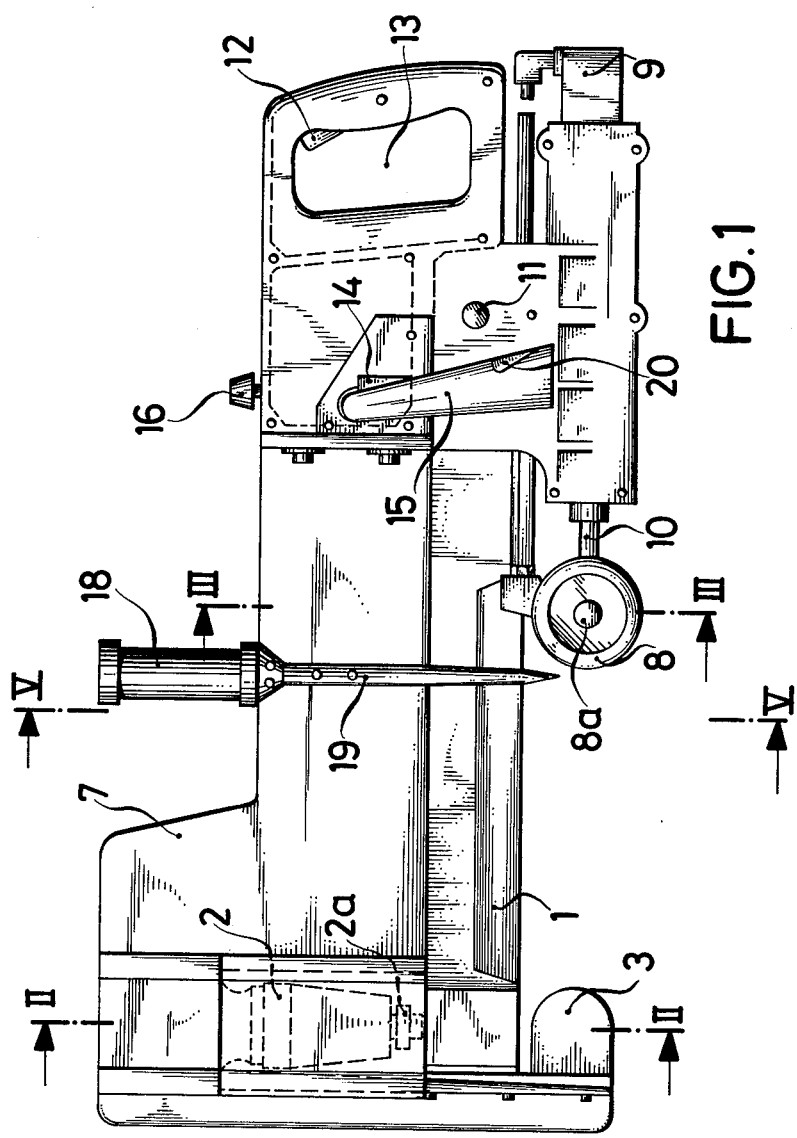
FIG. 1 shows a diagrammatic elevation of the cutting means.
Figure 2:
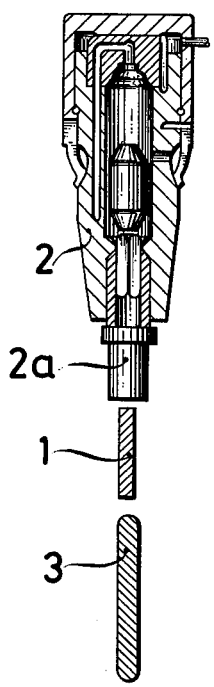
FIG. 2 shows a vertical section along line II—II of FIG. 1.

Referring to FIGS. 1 and 2, knife 1 is vertically reciprocated by pneumatic ram 2 impacting against transmission member 2a.

The end of knife 1 opposite the pneumatic ram 2 is pivotably supported by pivot pin 11.

Figure 4:
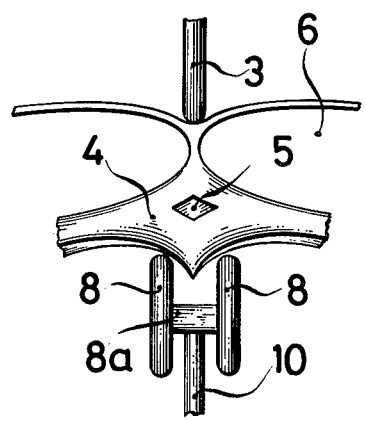
FIG. 4 shows schematically how the cutting means is guided along the vertebral column.

The knife 1, the ram 2 and transmission member 2a, and the guide member 3 are all supported in frame 7. A guide member suitable for engaging the dorsal side of the vertebral column of the carcass of an animal is shown at 3. As is best seen in FIG. 4, the guide member 3 is operative for engagement in the depression in the center dorsal portion of the vertebral column 4 to provide a guide for the knife 1. It will be appreciated that other guide members, such as a wheel, may also be utilized. Still referring to FIG. 4, the spinal core of the animal's vertebrae is shown at 5 while the surrounding muscle is indicated generally at 6.

Figure 3:
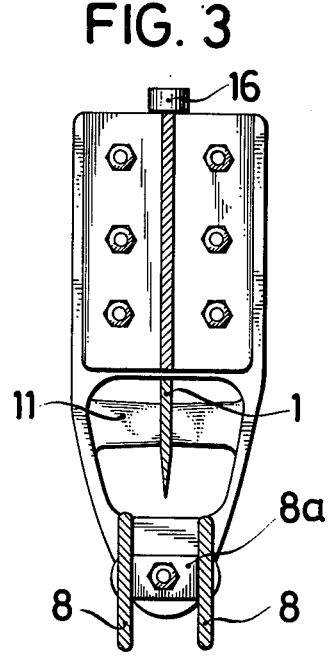
FIG. 3 shows a vertical section along line III—III of FIG. 1.

As seen best in FIGS. 1 and 3, a pair of wheels 8 are mounted for rotation on a common shaft 8a. As is shown in FIG. 4, the wheels 8 are suitable for engaging each side of the ridge formed at the ventral side of the vertebral column 4 of the animal for forming an opposed guide member for the ventral side of the carcass. It will be appreciated that, alternatively, a guide member such as a pair of slide rails may also be used.

Pneumatic cylinder 9 controls piston rod 10 in known manner for positioning the common shaft 8a of the wheels 8. The pressure with which the wheels 8 engage the vertebral column is controlled by the pneumatic cylinder. This control may include a manometer (not shown) for providing a constant pressure; in this instance the pneumatic cylinder would function as a resilient device.

The speed of the pneumatic ram 2 is suitably controlled in known manner by trigger member 12 disposed conveniently on handle 13. The position of the wheels 8 is suitably controlled by a manually operated valve 14 mounted on second handle 15.

For operation the apparatus according to the invention may have a hook (not shown) positioned so that when the apparatus is suspended, it is in balance. Any conventional support means for suspending the apparatus, such as a pneumatic cylinder or an electrically driven hoist pulley, may be used for support. Conveniently the vertical motion for cutting when utilizing such support means is initiated by pushbutton 16.

Figure 5:
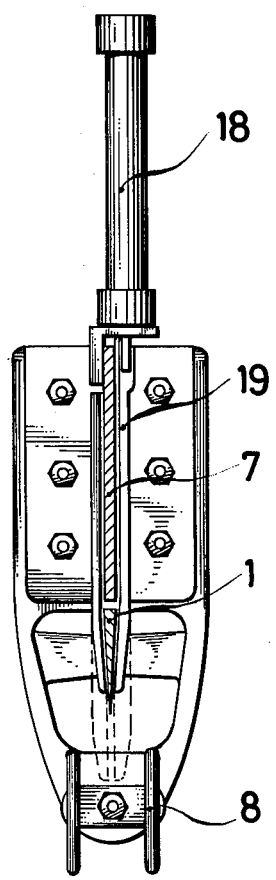
FIG. 5 shows a vertical section along line V—V of FIG. 1.

Another guide means comprising another pneumatic cylinder 18 and needle-shaped members or tines 19 are shown mounted on the frame 7 so that one tine is disposed on each side of the knife 1. As best seen in FIG. 5, the cylinder 18 controls the position of the needle shaped tines 19 to raise and lower the points thereof. The tines 19 may be forced into the spinal core 5 by means of the pneumatic cylinder 18 so that the apparatus is guided for cutting by the tines 19 moving through the spinal core 5 ahead of the knife 1. Conveniently the actuation of tines 19 may be accomplished by a control valve 20 also disposed on the second handle 15.

According to the preferred embodiment of the present invention the carcass if longitudinally cut in two parts along the vertebral column by means of the impact oscillated knife 1. During preferred operation, the knife 1 is sequentially guided in two different ways:

(1) by means of the guide member 3 positioned on the dorsal side of the carcass for following the vertebral column 4 and the opposing guide member 8 on the ventral side of the vertebral column, thus engaging the carcass therebetween, and (2) by means of the needle shaped guide 19 which can be introduced into the spinal core 5 ahead of the impact actuated knife 1.

In the initial phase of the splitting operation, method (1) is applied until the carcass has been split to a point just past the pelvic arch. When the cut reaches this point, the tines 19 can be forced into the spinal core 5 ahead of knife 1 for guiding in accordance with method (2). In the region between the pelvic arch of the carcass and the shoulder, the vertebral column has no abrupt bend so that the tines 19 can easily follow the vertebral column. The knife 1 then operates between the two tines 19 so that the cut through the vertebral column can be made through the spinal core thereof. It will be appreciated that when natural deformations in the vertebral column prevent method (2) from being used, method (1) may be used for splitting the entire carcass. The advantage of using both methods of guiding is that the greatest accuracy is obtained.

At the shoulder of the animal, the vertebral column has a natural bend which obstructs further downward motion of the tines 19. Thus, at this point, the tines 19 are retracted and method (1) is used for the remainder of the splitting operation.

The speed of the pneumatic ram 2 and the actuation of the cylinders 9 and 18 are controlled at the handles by the control valves 12, 15, and 20, respectively. The carcass is cut by the downwards movement of the knife 1 under the impact of the ram 2 which is only a short distance from the actual cutting point of the knife. The number of oscillations of the knife 1 should preferably be higher than 600 strokes per minute. For best results, the speed of the knife 1 should be approximately 3500 strokes per minute. When a stroke length of 10 mm. and a frequency of 3500 strokes per minute are used, a cutting frequency of approximately 200-225 hog carcasses per hour is achievable. In addition because of the small chiseling movements of the knife and the accurate guidance thereof, a very clean and even cut will be achieved.

The apparatus according to the invention is small and may be used for manual operation even without a support. It will also be appreciated that the operation may be almost fully automated by use of positioning control systems well known in the art.

It will be understood that the claims are intended to cover all changes and modifications of the preferred embodiment herein chosen for the purpose of illustration which do not constitute departures from the spirit and scope of the invention.

What is claimed is:

1. Apparatus for splitting a carcass comprising:
   (a) a frame;
   (b) a knife having two ends;
   (c) said knife at one of the ends thereof being pivotally mounted on said frame;
   (d) means adjacent the other end of said knife for vertically oscillating the other end of said knife for providing a short oscillating cutting stroke, said knife oscillating at a frequency greater than about 600 strokes per minute;
   (e) first guide means adjacent said other end of said knife said first guide means including a guide member adapted for engagement of the dorsal side of the carcass adjacent the vertebral column of the carcass; and
   (f) second guide means located intermediate the ends of the knife for guiding said knife along the vertebral column in the spinal core thereof.

2. The apparatus of claim 1 wherein said means for oscillating is a pneumatic ram.

3. The apparatus of claim 1 wherein said second guide means include a needle-shaped member having tines disposed on each side of said knife, said tines being adapted for insertion into the spinal core of the vertebral column of a carcass ahead of said knife whereby said knife will guidedly cut through the approximate center line of the vertebral column of the carcass.

4. The apparatus of claim 1 wherein the knife oscillates at a rate of about 3500 strokes per minute.

* * * * *